March 6, 1962
E. C. HAGEDORN
3,024,121
METHOD OF MAKING COLORED GLASS
Filed Jan. 14, 1960
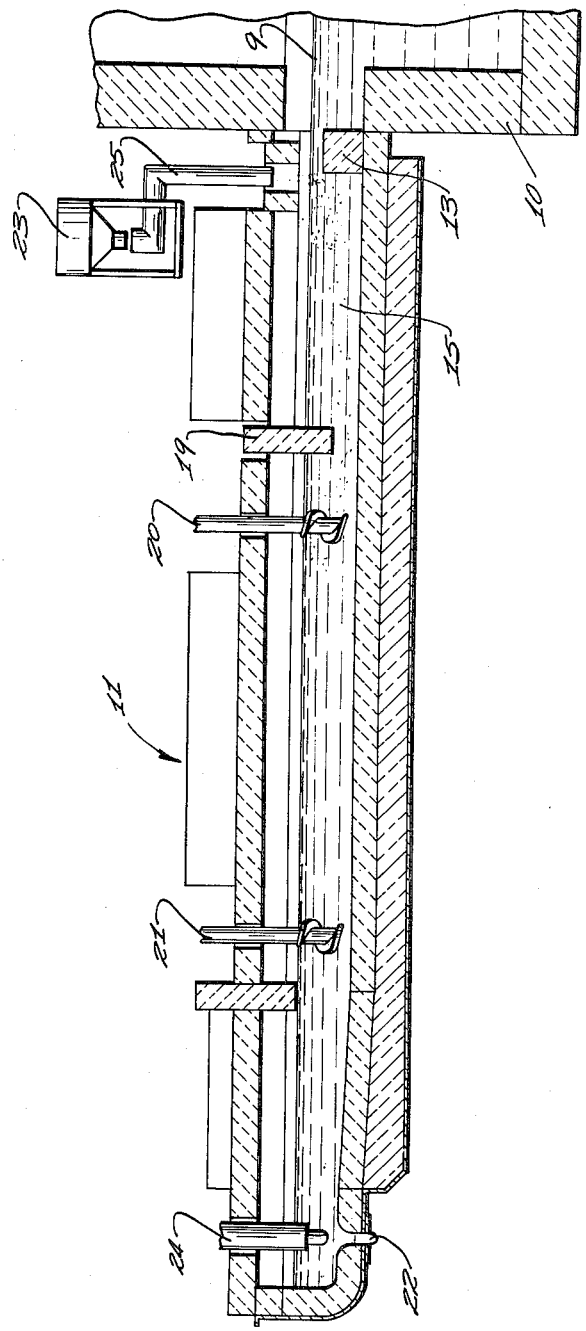
INVENTOR
ERWIN C. HAGEDORN
BY W. A. Schaich
Charles S. Lynch
ATTORNEYS United States Patent Office 3,024,121
Patented Mar. 6, 1962

3,024,121
METHOD OF MAKING COLORED GLASS
Erwin C. Hagedorn, Oregon, Ohio, assignor to Owens-Illinois Glass Company, a corporation of Ohio
Filed Jan. 14, 1960, Ser. No. 2,451
18 Claims. (Cl. 106—52)

The present invention relates to the manufacture of colored glass by the forehearth addition of a highly enriched colorant frit to a colorless molten base glass.

This application is a continuation-in-part of my earlier filed, co-pending application Serial No. 572,978 filed March 21, 1956, now abandoned, and assigned to the assignee of the instant application.

The above identified application set forth for the first time a highly novel method for the manufacture of colored glass by the addition of a finely divided, solid frit to a molten base glass, the base glass being of a temperature to melt the frit, followed by the admixture of the frit and the molten base glass to form an homogeneous colored composite glass.

In several commercially important green glasses, such as Georgia green, rum green, emerald green and champagne green, the primary colorant is chromium oxide. The frit must be "highly enriched" with colorant so that the final composite glass contains sufficient colorant to impart the desired coloration thereto. Due to the necessity of mixing the frit and the molten base glass within the fairly short length of travel of the base glass through the forehearth, to avoid excessive heat loss in the molten base glass because of the admixture therewith of the cold, solid frit glass, and additionally to avoid arriving at a composite glass having a chemical composition deviating deleteriously from that of the initial molten glass, it is necessary that a limited amount of frit be utilized. Preferably, the molten base glass and frit are mixed in proportions ranging from about 400-to-1 to about 40-to-1, this range of proportions forming a presently feasible operating range.

Thus, in order for the composite glass to have the desired colorant characteristics, the concentration of colorants in the frit must fall within the range of from 40 to 400 times the colorant concentration in the final composite glass. Thus, the phrase "highly colorant enriched" when applied to the frit designates a concentration of colorant in the frit sufficient to give the desired colorant concentration in the final glass after the frit is melted into and dispersed homogeneously through the molten base glass.

In my earlier application above identified, I set forth the novel concept of a method of making a colored glass utilizing highly colorant enriched frits, including chromium oxide as a colorant, in which improved admixture of the frit with the base glass was accomplished by substantially lowering the surface tension of the frit. In other words, I obtained improved admixture by a method involving the admixture of a frit with a molten base glass, the frit being of substantially lower surface tension than the molten base glass.

More specifically, I earlier proposed the preparation of highly colorant enriched frit by the substantial elimination of alumina ($Al_2O_3$), and preferably of both alumina and magnesia (MgO), from the frit compositions. This elimination of alumina and magnesia and the substitution therefore of increased amounts of silica ($SiO_2$) and lime (CaO) both (1) lowered the surface tension and (2) substantially increased the solubility of chrome as evidenced by the up to 100% greater retention of chromium oxide. In the present application a further large number of specific colored frit compositions are presented having very low surface tensions, which are applicable in my process of adding a colored frit to a molten colorless glass.

Briefly, the present invention proposes as a primary object the provision of a method of making a colored glass by the incorporation into a molten colorless base glass of a highly colorant enriched frit having a surface tension substantially less than that of the base glass and containing at least 1.5% chromium oxide.

Surface tension values as low as about 220 dynes per cm. and the retention of very large amounts of chromium oxide can be obtained by the utilization of frits substantially free of $Al_2O_3$, MgO, CaO and BaO.

Another important object of the present invention resides in the method of adding a solid glass frit to a molten forehearth stream of a colorless base glass, the frit having a surface tension substantially less than that of the molten base glass and containing chromium oxide at concentrations on the order of from 40 to 400 times the concentration of chromium oxide in the final composite glass, melting the frit in the molten base glass, and admixing the frit and the molten base glass to obtain a final composite glass of desired coloration.

It is a further object of this invention to provide an improved method for the manufacture of a composite colored glass by the addition to a colorless base glass in a molten state of a highly colorant enriched glass frit having a surface tension on the order of 312 dynes per cm. or less.

Yet another important object of the present invention is the provision of an improved method of making a colored glass by the addition of a highly enriched frit containing at least 1.5% chromium oxide and having a surface tension substantially less than that of the molten base glass and on the order of 312 dynes per cm. or less, the frit being added to the base glass at a ratio by weight ranging from 1-to-40 to 1-to-400. Examples of applicable frits containing 1.5 to 7 weight percent chromium oxides are presented herein.

Other and further objects of this invention will become apparent from the following description.

On the drawings:

The single FIGURE of the drawing is a longitudinal sectional elevational view, partially diagrammatic, of an apparatus which may be used in practicing the method of the present invention.

This apparatus includes a furnace tank 10 in which the base glass is melted and refined. A plurality of forehearths 11 may be provided in connection with the tank. The molten glass 9, herein referred to as the base glass, flows from the tank over a dam 13 into a channel extending the length of the forehearth. The frit material which is supplied in regulated amounts to the forehearth is fed from a hopper 23 and discharged by gravity through a spout or spouts 25. The frit during its passage through a melting section 15 of the forehearth is melted and mixed to some extent with base glass. This mixture flows beneath a skimmer block 19. Stirring devices 20 and 21 effect further mixing of the glass constituents, resulting in a homogeneous glass which is discharged through an outlet 22. The discharge of the glass is under the control of a feeder mechanism 24 by which measured charges or gobs of the glass are severed from the supply body and delivered to the molds of the forming machine.

The glass which is added to the base glass flowing from the tank 10 is supplied in the form of a solid frit produced by melting the raw batch materials, cooling and reducing them to a powdered or granulated form, as by introducing the melted raw batch materials directly into a body of water. In its finely particulated form, the frit is absorbed and melted in the forehearth at a temperature much lower than that required for melting the raw batch forming the base glass. The amount of frit entering the forehearth is usually only a small fraction of the amount of base glass flowing from the tank 10, the proportion of base glass-to-frit depending upon the composition of the frit, the intensity of the color desired in the end product, or other variable factors. As above explained, the ratio of base glass to frit generally varies from 40-to-1 to 400-to-1.

The above described apparatus is only exemplary of several forms of apparatus which may be used in practicing the invention, and illustrates, rather schematically, the adaption to the method to existing forehearth constructions.

PREPARATION OF THE BASE GLASS

The base glass preferably used in practicing the present invention is essentially a conventional glass of the type commonly utilized in the manufacture of colorless or "milk-bottle pink" containers. The oxides and the ranges of percentages thereof fall within the following ranges:

*Table I*

| Oxide: | Percent by weight |
| --- | --- |
| $SiO_2$ | 60-to-75 |
| $Al_2O_3$ | 0.3 to 10 |
| $CaO+MgO$ | 6 to 15 |
| $Na_2O$ | 12 to 18 |
| $K_2O$ | .0 to 5 |
| $BaO$ | .0 to 5 |
| Se | 0.00025 to 0.00035 |

Base glass compositions coming within the ranges above given in Table V can be used with the various frit compositions herein specified. It is often desirable that the percentages of the various oxides comprising the frit composition be substantially the same as the percentages of the same oxides in the base glass compositions with which they are used, except as regards the several oxides used for modifying the base glass in the manner heretofore pointed out, the modifying oxides including $Cr_2O_3$, $Al_2O_3$, $BaO$ and $MgO$. However, as pointed out later, when good mixing is attainable in the forehearth, this criterion can be ignored.

The following Examples I and II are soda-lime-flint batches which may be used in making the molten base (clear) glass in the present invention:

*Table II*

| | Example I, percent | Example II, percent |
| --- | --- | --- |
| $SiO_2$ | 72.01 | 71.45 |
| $Al_2O_3$ | 1.74 | 1.32 |
| $Fe_2O_3$ | .039 | .037 |
| $TiO_2$ | .029 | .013 |
| CaO | 11.38 | 8.32 |
| MgO | 1.15 | 5.58 |
| Alkalies | 13.65 | 13.28 |
| Selenium | 0.00025–0.00030 | 0.00025–0.00035 |

The conditions and procedures for making such molten base glasses are conventional and such conditions are well known to those skilled in the art, as exemplified in Table XX, B-11, on page 245 of "Handbook of Glass Manufacture," by Tooley, Ogden Publishing Co., New York, N.Y., 1953.

Generally the base glass issues from the melting tank or refiner and enters the forehearth at a temperature of from about 2300° F. to about 2600° F., and this temperature is well adapted for the addition of the frit which is in finely divided form, e.g., of from −8 to +30 mesh. In some instances, it was found that frit dispersion was enhanced by increasing the forehearth temperatures at the point of addition. For example, a melter tank temperature of 2280° F. may be increased to a temperature of 2350° F. at the forehearth addition point and the temperatures thereafter diminished along the length of the forehearth to a forehearth outlet temperature of 2070° F. A forehearth suitable for such operation is fully disclosed in the copending application of Rough and Swain, Serial No. 578,632 filed April 17, 1956, assigned to the assignee of the present invention.

It will be noted that the base glass compositions each contain selenium, as is common in colorless or "pink" flint glass compositions, and ferrous ($Fe++$) iron as an impurity although the indicated analysis lumps all the iron content as calculated $Fe_2O_3$. The FeO content usually introduced as a sand impurity, is limited to less than about 0.02% by weight as a quality control measure.

As indicated in the disclosure in said application, the frit composition is prepared by melting in a separate unit melter or day tank in which the frit composition is melted under oxidizing fining conditions (oxidizing atmosphere in melter), such melt being carried on so that the glass temperature of the melted frit is in the range 2700–2780° F. The melted colorant frit is fed as a molten stream from an outlet from the melter of water, so that the frit breaks up into granulated and chilled rapidly, such as by feeding it into a body form.

DESIRED FINAL GLASS OPTICAL PROPERTIES

In the manufacture of colored glasses, and particularly green glasses, certain specified color standards must be met. Such standards are usually defined in terms of "purity," "dominant wave length" and "brightness."

The "purity" of the glass as used herein specifies that percentage of the light transmitted that is within the dominant wave length range for a particular glass color. The glass absorbs the remaining light of that wave length. For example, using a Georgia green glass of commercially acceptable specification, light of the wave length 515–545 millimicrons is the "dominant wave length" range of the light of that color and if "purity" is indicated as 5%, this means 5% of the light within that dominant wave length range is being transmitted by the glass. The remaining 95% of that wave length is absorbed by the glass.

"Brightness," on the other hand, as referred to herein, is stated as a percentage of total light transmission by the glass. If Georgia green glass has a 75% "brightness" characteristic, it transmits 75% of the light of all wave lengths.

*Table III*

INDUSTRY OPTICAL STANDARDS FOR COMPOSITE GLASSES

Georgia Green:
  Dominant wave length _____ mu__ 515 to 545
  Purity _____ percent__ 2.0 to 5
  Brightness _____ do____ 70 to 80
Rum Green:
  Dominant wave length _____ mu__ 542 to 555
  Purity _____ percent__ 6 to 8
  Brightness _____ do____ 67 to 70

Table III—Continued

Emerald Green:
    Dominant wave length _____ mu__ 550 to 562
    Purity _____ percent__ 55 to 80
    Brightness _____ do____ 26 to 42

Champagne Green:
    No Standards.

Table IV

COLORING CONSTITUENTS OF COMPOSITE GLASSES

Normal Georgia Green:
    Total iron _____ 0.04 to 0.06% (as $Fe_2O_3$).
    $Cr_2O_3$ _____ 0.015 to 0.021%.
    $CrO_3$ _____ None.
    CoO _____ 0.0009 to 0.0011%.

Normal Rum Green:
    Total iron _____ 0.05 to 0.07 (as $Fe_2O_3$).
    $Cr_2O_3$ _____ 0.031%.
    $CrO_3$ _____ None.
    CoO _____ 0.0013%.

Normal Emerald Green:
    Total iron _____ 0.175 to 0.250% (as $Fe_2O_3$).
    $Cr_2O_3$ _____ 0.16 to 0.24%.
    $CrO_3$ _____ None.
    CoO _____ None.

Normal Champagne Green:
    Total iron _____ 0.07 to 0.09% (as $Fe_2O_3$).
    $Cr_2O_3$ _____ 0.07 to 0.09%.
    $CrO_3$ _____ None.
    NiO _____ 0.06%.
    CoO _____ 0.004%.

Georgia Green:
    $Fe_2O_3$ _____ 0.054%.
    Total chromium ____ 0.021 (as $Cr_2O_3$).
    $CrO_3$ _____ Trace.
    CoO _____ 0.0009.
    FeO _____ None.

Rum Green:
    $Fe_2O_3$ _____ 0.070%.
    Total chromium ____ 0.037% (as $Cr_2O_3$).
    $CrO_3$ _____ Trace to 0.001%.
    CoO _____ 0.0013%.
    FeO _____ None.

Emerald Green:
    $Fe_2O_3$ _____ 0.093 to 0.125.
    Total chromium ____ 0.140 to 0.17% (as $Cr_2O_3$).
    $CrO_3$ _____ Trace to .02%.
    FeO _____ None.
    CoO _____ 0.002 to .006%.

Champagne Green:
    $Fe_2O_3$ _____ 0.05 to 0.08%.
    Total chromium ____ .06 to .1% (as $Cr_2O_3$).
    $CrO_3$ _____ Trace to 0.02%.
    FeO _____ None.
    CoO _____ .004 to .013%.
    NiO _____ .04 to .06%.

THE EFFECT OF COMPOSITION ON SURFACE TENSION

The process of mixing of the base glass and the frit can be greatly assisted by preparing the frit to have low viscosity and/or low surface tension. Low values of these properties in the frit glass tend to promote intermixing and interdiffusion, and can be obtained by suitable choice of frit glass composition. For example, it is desirable to keep the alumina and magnesia content of the frit glass as low as permitted by available sources of raw materials, certainly substantially lower than in the base glass, and also lower than the amount desired in the final composition resulting from the admixture of the frit and the base glasses.

Restricting the percentage of CaO and BaO in the frit glass also lowers the surface tension and thus promotes ease of mixing the frit with the base glass. It is usually desirable to limit these components to not more than 5% to obtain frits of very low surface tension.

In decreasing the alumina in the frit glass, another oxide is substituted. The preferred substitution is silica for alumina, since this decreases both viscosity and surface tension without large changes in thermal expansion. In many cases it is desirable to avoid as far as possible wide differences in thermal expansion between the frit and base glass compositions in order to minimize the risk of cordy glass, which would result from incomplete mixing of two compositions differing greatly in thermal expansion. However, where the mixing in the mixing tank, or forehearth, is very efficient so that a substantially completely homogeneous mixture of the colored glass frit and the base glass is achieved therein, it becomes unimportant to closely match the thermal expansion.

The following table, Table V, shows the effect of a substitution of silica for alumina in two typical compositions, on the properties of surface tension, viscosity and expansion. These compositions are commonly used for making containers such as bottles, jars and the like. In line with usual custom, the effect on viscosity is indicated by the temperature required to reach log 3 viscosity. This viscosity is reasonably close to that which glass normally has in the forehearth channel.

Table V

EFFECT OF SUBSTITUTING $SiO_2$ FOR $Al_2O_3$

| | 1 | 2 | 3 | 4 |
|---|---|---|---|---|
| $SiO_2$ | 64.5 | 73.5 | 71.5 | 74.5 |
| $Al_2O_3$ | 9.0 | -------- | 3.0 | -------- |
| CaO | 9.0 | 9.0 | 11.0 | 11.0 |
| $Na_2O$ | 15.5 | 15.5 | 12.5 | 12.5 |
| $K_2O$ | 2.0 | 2.0 | 2.0 | 2.0 |
| Surface tension, dynes/cm | 327 | 303 | 320 | 312 |
| Log viscosity =3, °F | 2,295 | 2,060 | 2,195 | 2,160 |
| Thermal expansion ($\times 10^7$) | 98.4 | 98.8 | 90.1 | 90.0 |

In the above Table V, column 1 gives a composition which may be used as the base glass. The composition in column 2 differs from that of column 1 by omitting the $Al_2O_3$ and substituting an equal amount of $SiO_2$. The composition of column 2 may be used as the frit glass which together with a colorant or other modifying element, may serve as the frit for mixture with the base glass of column 1. The compositions of columns 3 and 4 differ in like manner by the substitution in column 4 of $SiO_2$ for the $Al_2O_3$ of column 3.

In frit glasses to be used for the purpose of adding green color to the base glass, there is a further advantage of the low alumina or alumina-free frit glass compositions. It has been found that the lower alumina compositions will dissolve and hold larger quantities of $Cr_2O_3$, which is the effective green coloring oxide in most green glasses. This increased solubility of $Cr_2O_3$ makes it possible to prepare frit glasses having greater coloring power by reason of having higher $Cr_2O_3$ contents, thus requiring smaller additions of frit to the base glass to produce a specified color. Further, the increased $Cr_2O_3$ content of such frits in itself decreases their surface tension, thus facilitating the mixing with the base glass.

Further, in the preparation of frit glasses containing $Cr_2O_3$, the presence of MgO reduces the amount of $Cr_2O_3$ which can be dissolved and retained. Thus, in preparing frits containing $Cr_2O_3$, it is desirable to keep the MgO as low as permitted by available raw materials.

The effect of low alumina and low magnesia on the solubility of $Cr_2O_3$ is shown by the data in Table VI.

Table VI
SOLUBILITY OF $Cr_2O_3$

|  | 1 | 2 | 5 | 6 |
|---|---|---|---|---|
| $SiO_2$ | 64.5 | 73.5 | 72.0 | 72.0 |
| $Al_2O_3$ | 9.0 |  | 1.5 | 1.5 |
| CaO | 9.0 | 9.0 | 7.3 | 12.5 |
| MgO |  |  | 5.2 |  |
| BaO |  |  | 0.5 | 0.5 |
| $Na_2O$ | 15.5 | 15.5 | 13.5 | 13.5 |
| $K_2O$ | 2.0 | 2.0 |  |  |
| Percent of $Cr_2O_3$ which can be dissolved and retained | 1.0 | 2.0 | 1.0 | 1.5 |

In the above Table VI the compositions given in columns 1 and 2 are the same as in Table V. As shown in Table VI the percentage of $Cr_2O_3$ which can be dissolved and retained is doubled, or increased from 1% to 2% by the elimination of the $Al_2O_3$ and substitution therefor of $SiO_2$. A comparison of the compositions in columns 5 and 6 shows that by eliminating or reducing the MgO to zero, substituting therefor an equal amount of CaO, the percentage of chromium oxide that can be dissolved and retained is substantially increased.

The above Tables V and VI set forth the substantial reduction in surface tension of and the materially increased chromium oxide concentration retained by frits wherein the $Al_2O_3$ and MgO content is replaced by $SiO_2$ and CaO, respectively.

The following table, Table VII, illustrates a desirable frit composition for use in obtaining green glass by addition to any one of three typical flint glasses used commercially in the manufacture of containers such as bottles, jars and tumblers.

Table VII

|  | Frit composition 7 | Typical flint base glass compositions | | |
|---|---|---|---|---|
| $SiO_2$ | 72.5 | 72.0 | 72.0 | 71.5 |
| CaO | 12.5 | 12.5 | 7.3 | 11.0 |
| $Na_2O$ | 13.5 | 13.5 | 13.5 | 12.5 |
| $Cr_2O_3$ | 1.5 |  |  |  |
| $Al_2O_3$ |  | 1.5 | 1.5 | 3.0 |
| BaO |  | 0.5 | 0.5 | 2.0 |
| MgO |  |  | 5.2 |  |

The following table, Table VIII, gives the range of percentages of the constituents of the base glass compositions indicated in the above Table VII. Base glasses coming within this range can be used with the frit composition given in Tables VII and VIII.

Table VIII

|  | Frit composition | Range of base glass compositions |
|---|---|---|
| $SiO_2$ | 72.5 | 71.5 to 72 |
| CaO | 12.5 | 7.3 to 12.5 |
| $Na_2O$ | 13.5 | 12.5 to 13.5 |
| $Cr_2O_3$ | 1.5 |  |
| $Al_2O_3$ |  | 1.5 to 3.0 |
| BaO |  | 0.5 to 2.0 |
| MgO |  | 0.0 to 5.2 |

In Table IX the following specific examples of highly colorant enriched frit compositions are illustrative of other frit compositions having low surface tensions, all below 300 dynes/cm., which are useful in the method of my invention to color a conventional, substantially colorless or "milk-bottle pink" base glass, such as the glasses of Tables I, II, VII and VIII, for instance. It will be noted that alumina and magnesia are completely absent in these compositions, and that CaO and BaO are present in amounts less than 5%, thus lowering surface tension. In some of the compositions the presence of $B_2O_3$ further contributes to a lowering of the surface tension. High $Na_2O$ and $K_2O$ also contribute to surface tension lowering in many of the compositions.

Table IX

| Ingredient | Theoretical compositions | | | | | | |
|---|---|---|---|---|---|---|---|
|  | 8 | 9 | 10 | 11 | 12 | 13 | 14 |
| $SiO_2$ | 71.52 | 68.04 | 66.18 | 67.18 | 69.12 | 68.79 | 59.42 |
| $Na_2O$ | 19.09 | 18.14 | 17.65 | 17.92 | 18.43 | 18.34 | 20.00 |
| $K_2O$ | 0.89 | 1.96 | 4.37 | 3.89 | 1.48 | 1.62 | 4.15 |
| $B_2O_3$ |  |  | 4.42 | 4.48 | 4.61 | 4.59 | 5.00 |
| BaO |  | 4.54 |  |  |  |  |  |
| CaO | 4.77 |  |  |  |  |  |  |
| $Fe_2O_3$ | 0.89 | 1.96 |  |  | 1.50 | 1.62 |  |
| NiO |  |  | 0.32 | 0.26 | 0.25 |  | 4.50 |
| CoO |  |  |  |  |  |  | 0.93 |
| $Cr_2O_3$ [1] | 2.86 | 5.36 | 7.06 | 6.27 | 4.61 | 5.04 | 6.00 |
| $Cr_2O_3$ [1] by analysis | 2.78 | 5.36 | 7.00 | 6.14 | 4.66 | 5.08 | 6.42 |
| $CrO_3$ by analysis | N.D. | 2.05 | N.D. | N.D. | 1.61 | N.D. | N.D. |
| Surface tension (dynes/cm.) | 292 | 284 | 258 | 259 | 269 | 268 | 250 |

| Ingredient | Theoretical compositions | | | | | | |
|---|---|---|---|---|---|---|---|
|  | 15 | 16 | 17 | 18 | 19 | 20 | 21 |
| $SiO_2$ | 60.79 | 63.31 | 69.38 | 61.89 | 68.36 | 64.77 | 62.79 |
| $Na_2O$ | 20.00 | 20.00 | 4.63 |  |  | 18.23 |  |
| $K_2O$ | 3.71 | 1.54 | 18.50 | 26.80 | 1.69 | 27.17 | 26.91 |
| $B_2O_3$ | 5.00 | 5.00 | 1.43 | 4.14 | 4.56 |  |  |
| BaO |  |  |  |  |  | 4.31 | 4.25 |
| CaO |  | 1.56 | 1.43 | 1.70 | 1.69 | 0.89 | 1.43 |
| $Fe_2O_3$ |  | 3.38 |  |  |  |  |  |
| NiO | 4.13 | 0.71 |  |  |  |  |  |
| CoO | 0.87 |  |  |  |  |  |  |
| $Cr_2O_3$ [1] | 5.50 | 4.50 | 4.63 | 5.47 | 5.47 | 2.86 | 4.62 |
| $Cr_2O_3$ [1] by analysis | 5.81 | 4.83 | 4.74 | 5.09 | 5.20 | 2.59 | 4.05 |
| $CrO_3$ by analysis | N.D. | N.D. | 1.73 | N.D. | 1.91 | N.D. | N.D. |
| Surface tension (dynes/cm.) | 252 | 262 | 269 | 224 | 268 | 243 | 238 |

| Ingredient | Theoretical compositions | | | | | |
|---|---|---|---|---|---|---|
|  | 22 | 23 | 24 | 25 | 26 | 27 |
| $SiO_2$ | 69.38 | 65.76 | 60.97 | 60.56 | 66.40 | 67.36 |
| $Na_2O$ | 18.50 | 17.68 |  |  | 17.70 | 17.96 |
| $K_2O$ | 1.43 | 3.20 | 26.68 | 25.90 | 4.39 | 3.90 |
| $B_2O_3$ |  | 2.09 |  | 2.84 | 4.43 | 4.49 |
| BaO | 4.63 | 1.87 | 4.12 | 3.02 |  |  |
| CaO |  | 1.98 |  |  |  |  |
| $Fe_2O_3$ | 1.43 | 0.93 | 1.94 | 1.93 |  |  |
| CoO |  | 0.26 |  | 0.23 |  |  |
| $Cr_2O_3$ [1] | 4.63 | 6.23 | 6.29 | 5.52 | 7.08 | 6.29 |
| $Cr_2O_3$ [1] by analysis | 4.43 |  | 5.44 |  | 6.92 | 6.24 |
| $CrO_3$ by analysis | N.D. | N.D. | N.D. | N.D. | 3.05 | 2.73 |
| Surface tension (dynes/cm.) | 282 | 287 | 238 | 247 | 258 | 259 |

[1] Total chromium oxides as $Cr_2O_3$.

According to the invention the colored frit glass composition has a surface tension substantially less than that of the base glass to which it is added. Numerically, the frit surface tension is less than 312 dynes/cm. and preferably less than 300 dynes/cm.

The chromium oxide is specified in each frit example as "$Cr_2O_3$" and is a measure of the total chromium oxide content. Preferably at least a part of the specified "$Cr_2O_3$" content of the frit is in the form of hexavalent chromium (as $CrO_3$). The actual $CrO_3$ content of any given frit is dependent upon two factors, namely (1) the addition of the chromium to the frit batch as potassium dichromate and (2) the oxidation state of the frit batch during melting. In certain examples, e.g., Examples 11, 14 and 15, all of the chromium was added as dichromate. In certain other examples, e.g., Examples 8, 9 and 12, the chromium was added as equal parts by weight chromite (a mineral containing $FeO \cdot Cr_2O_3$, and potassium dichromate. In the manufacture of ultra-violet absorbent composite glasses a residual hexavalent chromium content is desired and an oxidizing agent such as niter is preferably added to maintain strongly oxidizing conditions in the frit batch. A full discussion of the $Cr_2O_3$—$CrO_3$ relation is to be found in the copending application of A. B. Swain, Serial No. 804,142, filed April 6, 1959, and assigned to the assignee of the present invention.

The embodiments of the invention in which an exclusive property or privilege is claimed, are defined as follows:

1. The method of producing a colored glass which comprises producing a molten base glass which consists essentially of the following constituents in substantially the following proportions, namely,

| | Parts |
|---|---|
| $SiO_2$ | 71.5 |
| $Al_2O_3$ | 3.0 |
| CaO | 11.0 |
| $Na_2O$ | 12.5 |
| $K_2O$ | 2.0 | adding to the molten base glass, a frit comprising a colorant and essentially the following constituents in substantially the following proportions, namely,

| | Parts |
|---|---|
| $SiO_2$ | 74.5 |
| CaO | 11.0 |
| $Na_2O$ | 12.5 |
| $K_2O$ | 2.0 | said frit being added to the base glass in granulated form, melting the frit in the molten base glass, and mixing the molten frit and base glass and thereby producing a homogeneous glass.

2. The method of producing a colored glass which comprises melting a base glass consisting essentially of the following oxides in substantially the following proportions, namely,

| | Parts |
|---|---|
| $SiO_2$ | 72.0 |
| $Al_2O_3$ | 1.5 |
| CaO | 7.3 |
| MgO | 5.2 |
| BaO | 0.5 |
| $Na_2O$ | 13.5 | adding to the molten base glass a frit glass comprising the following oxides in the following constituents in essentially the following proportions, namely,

| | Parts |
|---|---|
| $SiO_2$ | 72.0 |
| $Al_2O_3$ | 1.5 |
| CaO | 12.5 |
| BaO | 0.5 |
| $Na_2O$ | 13.5 |
| $Cr_2O_3$ | 1.5 | and melting the frit and stirring together the base glass and melted frit thereby producing a homogeneous colored glass.

3. The method of producing a green glass which comprises melting a base glass consisting essentially of the following constitutents in essentially the following proportions,

| | Percent |
|---|---|
| $SiO_2$ | 72.0 |
| CaO | 12.5 |
| $Na_2O$ | 13.5 |
| $Al_2O_3$ | 1.5 |
| BaO | 0.5 | adding to the molten base glass a frit comprising the following constituents in essentially the following proportions,

| | Percent |
|---|---|
| $SiO_2$ | 72.5 |
| CaO | 12.5 |
| $Na_2O$ | 13.5 |
| $Cr_2O_3$ | 1.5 | mixing the frit with the molten base glass and melting the frit by the heat supplied by the said molten base glass, and stirring and mixing the molten base and frit glasses until a homogeneous glass is produced.

4. The method of producing a green glass which comprises producing a molten base glass consisting essentially of the following oxides substantially within the following ranges of percentages, namely,

| | Percent |
|---|---|
| $SiO_2$ | 71.5 to 72 |
| CaO | 7.3 to 12.5 |
| $Na_2O$ | 12.5 to 13.5 |
| $Al_2O_3$ | 1.5 to 3.0 |
| BaO | 0.5 to 2.0 |
| MgO | 0 to 5.2 | adding to the base glass while in a molten condition a glass frit consisting essentially of

| | Percent |
|---|---|
| $SiO_2$ | 72.5 |
| CaO | 12.5 |
| $Cr_2O_3$ | 1.5 |
| $Na_2O$ | 13.5 | and thereby melting the frit, and mixing the molten base glass and frit together and thereby producing a homogeneous colored glass.

5. The method defined in claim 4 including flowing the molten base glass in a stream from a melting and refining tank, the frit glass being in granulated form and added by gravity to the flowing stream of base glass whereby the frit is melted as it flows downstream with the base glass, the said mixing being effected by stirring the combined base glass and frit after the frit is melted and during the continued flow beyond the melting zone.

6. The method of making a colored glass which comprises adding a colored essentially soda-lime flint glass frit substantially free from alumina to a molten soda-lime flint base glass which includes a substantial amount of alumina and while the base glass is at a temperature to melt the frit, and mixing the molten base glass and frit to melt the frit and thereby forming a homogeneous colored glass.

7. The method of making a colored glass which comprises adding to and mixing with a molten base glass including alumina, a glass frit substantially free from alumina and including a chromium oxide, the base glass being at a temperature to melt the frit, and mixing the frit with the molten base glass and thereby forming a homogeneous colored glass.

8. In making a colored glass, the base composition of which resides within the following range:

| | Percent |
|---|---|
| $SiO_2$ | 60 to 75 |
| $Al_2O_3$ | 0.3 to 10 |
| CaO | 3.5 to 12.5 |
| MgO | 0 to 6.27 |
| $Na_2O$ | 12 to 18 |
| $K_2O$ | .0 to 5 |
| BaO | .0 to 5 | the method which comprises melting and refining a composition within said range and thereby producing a molten base glass, passing said molten base glass through a heated forehearth while adding thereto and melting therein a colored glass frit, said frit having a base composition wherein the oxides included in both the base glass and frit base compositions are present in equal percentages with the exception that the percentage of the $SiO_2$ content of said frit base composition is equal to the total percentage of the $SiO_2$ and $Al_2O_3$ of the base glass composition and the frit is free from $Al_2O_3$, said frit composition including in addition from 1.5 to 2.0 percent $Cr_2O_3$ as a coloring agent.

9. In making a colored glass, the base composition of which resides within the following range:

| | Percent |
|---|---|
| $SiO_2$ | 60 to 75 |
| $Al_2O_3$ | 0.3 to 10 |
| CaO | 3.5 to 12.5 |
| MgO | 0 to 6.27 |
| $Na_2O$ | .0 to 5 |
| $K_2O$ | .0 to 5 |
| BaO | .0 to 5 | the method comprising melting and refining a molten base glass, passing said molten base glass through a heated forehearth while adding thereto and melting therein a glass coloring frit, said frit having a base composition wherein the oxides included in both the base glass and frit base composition are present in equal amounts with the exception that the $SiO_2$ content of said frit base composition will be equal to the total content of the $SiO_2$ and $Al_2O_3$ of the base glass composition, said frit composition included $Cr_2O_3$ present in an amount depending upon the reduction in the amount of $Al_2O_3$ in the frit base glass composition.

10. In making a colored glass, the base composition of which resides with the following range:

| | Percent |
|---|---|
| $SiO_2$ | 60 to 75 |
| $Al_2O_3$ | 0.3 to 10 |
| CaO | 3.5 to 12.5 |
| MgO | 0 to 6.27 |
| $Na_2O$ | 12 to 18 |
| $K_2O$ | .0 to 5 |
| BaO | .0 to 5 | the method comprising melting and refining a molten base glass, passing said molten base glass through a heated forehearth while adding thereto and melting therein a glass coloring frit, said frit having a base composition wherein the oxides included in both the base glass and frit base composition are present in equal amounts with the exception that the CaO content of the frit base composition will be equal to the total content of MgO and CaO in the base glass composition, said frit composition including $Cr_2O_3$ as a coloring agent.

11. In making a colored glass, the base composition of which resides within the following range:

| | Percent |
|---|---|
| $SiO_2$ | 60 to 75 |
| $Al_2O_3$ | 0.3 to 10 |
| CaO | 3.5 to 12.5 |
| MgO | 0 to 6.27 |
| $Na_2O$ | 12 to 18 |
| $K_2O$ | .0 to 5 |
| BaO | .0 to 5 | the method comprising melting and refining a molten base glass, passing said molten base glass through a heated forehearth while adding thereto and melting therein a glass coloring frit, said frit having a base composition wherein the oxides included in both the base glass and frit base composition are present in equal amounts with the exception that the CaO content of said frit base composition will be equal to the total content of the CaO and MgO of the base glass composition, said frit composition including $Cr_2O_3$ present in an amount depending upon the reduction in the amount of MgO in the frit base glass composition.

12. In making a colored glass, the base composition of which resides within the following range:

| | Percent |
|---|---|
| $SiO_2$ | 60 to 75 |
| $Al_2O_3$ | 0.3 to 10 |
| CaO | 3.5 to 12.5 |
| MgO | 0 to 6.27 |
| $Na_2O$ | 12 to 18 |
| $K_2O$ | .0 to 5 |
| BaO | .0 to 5 | the method comprising melting and refining a molten base glass, passing said molten base glass through a heated forehearth while adding thereto and melting therein a glass coloring frit, said frit having a composition wherein the oxides included in the base glass composition are present in the frit composition in equal amounts with the exception that the total $SiO_2$ and CaO content of the frit base composition will be equal to the total content of $SiO_2+Al_2O_3+CaO+MgO$ in the base glass composition, and the frit composition contains an addition from 1.5 to 2.0 percent $Cr_2O_3$.

13. In making a colored glass, the base composition of which resides within the following range:

| | Percent |
|---|---|
| $SiO_2$ | 60 to 75 |
| $Al_2O_3$ | 0.3 to 10 |
| CaO | 3.5 to 12.5 |
| MgO | 0 to 6.27 |
| $Na_2O$ | 12 to 18 |
| $K_2O$ | .0 to 5 |
| BaO | .0 to 5 | the method comprising melting and refining a molten base glass, passing said molten base glass through a heated forehearth while adding thereto and melting therein a glass coloring frit, said frit having a base composition wherein the oxides included in both the base glass and frit base composition are present in equal amounts with the exception that the total $SiO_2$ and CaO content of the frit base composition will be equal to the total content of $SiO_2+Al_2O_3+CaO+MgO$ in the base glass composition, said frit composition including $Cr_2O_3$ as a coloring agent and being present in an amount depending upon the reduction in the amount of $Al_2O_3$ and MgO in the frit base composition.

14. In a method of making a colored glass, the steps of providing a body of a molten base glass having the composition:

| | Percent by weight |
|---|---|
| $SiO_2$ | 60 to 75 |
| $Al_2O_3$ | 0.3 to 10 |
| CaO+MgO | 6 to 15 |
| $Na_2O$ | 12 to 18 |
| $K_2O$ | 0 to 5 |
| BaO | 0 to 5 | adding to said molten base glass and homogeneously dispersing therein a highly colorant enriched glass frit containing at least 1.5% chromium oxide and substantially free of $Al_2O_3$ and MgO, said frit having a surface tension substantially less than that of said base glass and of not more than about 312 dynes/centimeter.

15. In a method of making a colored glass from a molten base glass containing alumina the step of adding to melting in and dispersing homogeneously throughout the molten base glass a solid finely particulated highly colorant enriched glass frit substantially free of alumina and having a surface tension substantially less than that of said molten base glass and not more than about 312 dynes/centimeter.

16. The method of claim 7, wherein the glass frit contains at least 1.5% chromium oxides and the frit has a surface tension substantially less than that of the base glass and less than about 312 dynes per centimeter.

17. In a method of making a colored glass from a molten colorless base glass containing alumina and flowing through a forehearth, the steps of depositing on the surface of the base glass an amount of a highly colorant enriched glass frit containing at least 1.5% chromium oxide and containing substantially less alumina than said base glass, the amount of frit being sufficient to yield a ratio of base glass to frit ranging from 40:1 to 400:1, melting the frit in the base glass, and homogeneously dispersing the frit in the base glass to form a composite colored glass.

18. The method of making a colored glass which comprises adding to a molten base glass containing alumina a glass frit having a surface tension and an alumina content substantially less than that of the base glass and containing at least 1.5% chromium oxide, the base glass being at a temperature to melt the frit, and mixing the frit with the molten base glass to form a homogeneous colored composite glass.

References Cited in the file of this patent
UNITED STATES PATENTS

| | | |
|---|---|---|
| 2,197,562 | Reinker | Apr. 16, 1940 |
| 2,599,349 | Ricker | June 3, 1952 |
| 2,923,635 | Beck et al. | Feb. 2, 1960 |

UNITED STATES PATENT OFFICE
CERTIFICATE OF CORRECTION

Patent No. 3,024,121            March 6, 1962

Erwin C. Hagedorn

It is hereby certified that error appears in the above numbered patent requiring correction and that the said Letters Patent should read as corrected below.

Column 4, line 38, after "melter" insert -- and chilled rapidly, such as by feeding it into a body --; column 8, line 67, after "FeO·$Cr_2O_3$" for the comma read a closing parenthesis.

Signed and sealed this 10th day of July 1962.

(SEAL)
Attest:

ERNEST W. SWIDER
Attesting Officer

DAVID L. LADD
Commissioner of Patents